United States Patent [19]

Pennise

[11] Patent Number: 4,621,448
[45] Date of Patent: Nov. 11, 1986

[54] FISHING APPARATUS

[76] Inventor: Matthew A. Pennise, Rte. 8, Box 786T, Pensacola, Fla. 32506

[21] Appl. No.: 707,896

[22] Filed: Mar. 4, 1985

[51] Int. Cl.$^4$ .............................................. A01K 79/00
[52] U.S. Cl. .................... 43/42.72; 43/42.7; 43/42.74
[58] Field of Search .................. 43/42.72, 42.7, 42.74, 43/27.4, 27.2, 43.1, 54.1, 100, 105

[56] References Cited

U.S. PATENT DOCUMENTS

| | | | |
|---|---|---|---|
| 419,054 | 1/1890 | Mayer | 43/42.7 |
| 626,777 | 6/1899 | Slotterbeck | 43/42.7 |
| 2,729,911 | 1/1956 | Leverth | 43/42.74 |
| 2,742,730 | 4/1956 | Karr | 43/42.74 |
| 2,848,835 | 8/1958 | Witt | 43/42.74 |
| 3,190,029 | 6/1965 | Bondi | 43/42.74 |

*Primary Examiner*—Nicholas P. Godici
*Assistant Examiner*—Kurt Rowan
*Attorney, Agent, or Firm*—George A. Bode

[57] ABSTRACT

A multiple fishing line apparatus which comprises an upper frame and a lower frame, both upper and lower frames substantially in a horizontal position having a central post extended therebetween. There would be further provided a plurality of outer arm members extending between the lower and upper frames, with a joint centrally located down the length of each arm so that movement of the frames toward one another will allow the arms to expand at the joints outwardly to an open, flared position. There is further provided a plurality of fishing lines extending between the upper and lower frames, each of said fishing lines having a plurality of hook members secured thereto. Upon sliding movement of the upper and lower frames toward one another, and the outer arms radiating outwardly at their center joints, the fishing lines would be secured so that the lines would radiate out with the arms to provide an extended apparatus with the fishing lines positioned throughout the radial area of the expanded frame for attracting a number of fish. Upon retrieval of the apparatus, the upper frame would move upward, withdrawing the extended arms to their vertical position and the apparatus would be raised out of the water and the unextended position with the fish secured to the individual hooks.

8 Claims, 3 Drawing Figures

FISHING APPARATUS

BACKGROUND OF THE INVENTION

1. Field of the Invention

The apparatus of the present invention relates to a Fishing Apparatus. More particularly, the present invention relates to an apparatus for accommodating a plurality of fishing hooks to secure a number of fish at a single casting of the apparatus.

2. General Background

In the art of fishing, it is, of course, more efficient if the fisherman can simultaneously cast a number of lines for retrieval of a multiple number of fish during a given time span. Particularly in the art of commercial fishing, when not using a casting net or the like, it would be more commercially valuable if the commercial fisherman is able to recover a number of fish from a number of lines simultaneously without having to man a plurality of individual fishing lines cast off the side of the boat. The most efficient manner of accomplishing this would be to develop an apparatus or the like which would be able to accommodate a number of fishing lines over a given area with the apparatus wherein the apparatus could be retrieved as a whole, having secured thereonto a quantity of fish at one given time.

There have been attempts to construct such an apparatus, which have resulted in patents, the most pertinent being as follows:

U.S. Pat. No. 3,646,700 issued to Pond entitled "Take Apart Fish Hook Or Lure Support," relates to the use of a multi-line fishing apparatus wherein a plurality of laterally directed wire arms are provided with a separate hook from a central support. The apparatus however fails to disclose the ability to spread into an open position upon reaching the bottom of the body of water for accommodating a greater number of hooks.

U.S. Pat. No. 2,196,472 issued to Moriarty entitled "Fishing Apparatus," relates to the use of plurality of fishing lines supported from a central post which would be embedded in a lake or river bottom. Although there is disclosed a plurality of lines from the laterally directed arms, the overall structure and operational features of the present invention are not disclosed in the patent.

U.S. Pat. No. 2,742,730 issued to Karr entitled "Chum Rig For Fishing And Crabbing," also discloses a plurality of fishing lines from a centrally located post, which rests on the bottom of the river or lake and provides for multiple fish hooks.

U.S. Pat. No. 3,417,502 issued to Thomas entitled "Heavy Load Fishing Device," relates to the use of a line or rig which enables one to reel out a series of multiple fish hooks and lines from a single pole.

U.S. Pat. No. 2,792,658 issued to Stafford entitled "Fishing Apparatus," relates to a means for reeling a fishing line in and out having a plurality of hooks extending from the main line, and discloses the reeling means as a bicycle chain or the like and not the multiple fishing apparatus itself.

U.S. Pat. No. 2,551,998 issued to Groot entitled "Submersible Drag," relates to the use of an apparatus which discloses a series of hooks extending therefrom, for dragging it along the bottom and recovering items which may be sitting on the bottom of a river or lake.

U.S. Pat. No. 2,814,901 issued to Siuter entitled "Fish Attracting Device," relates to the use of a multiple fishing line having multiple fish lures hanging from a single line and does not relate particularly to the present apparatus.

SUMMARY OF THE PRESENT INVENTION

The apparatus of the present invention solves the shortcomings in the present state of the art in a simple and straight forward manner. What is provided is a multiple fishing line apparatus which comprises an upper frame and a lower frame, both upper and lower frames substantially in a horizontal position having a central post extended therebetween. There would be further provided a plurality of outer arm members extending between the lower and upper frames, with a joint centrally located down the length of each arm so that movement of the frames toward one another will allow the arms to expand at the joints outwardly to an open, flared position. There is further provided a plurality of fishing lines extending between the upper and lower frames, each of said fishing lines having a plurality of hook members secured thereto. Upon sliding movement of the upper and lower frames toward one another, and the outer arms radiating outwardly at their center joints, the fishing lines would be secured so that the lines would radiate out with the arms to provide an extended apparatus with the fishing lines positioned throughout the radial area of the expanded frame for attracting a number of fish. Upon retrieval of the apparatus, the upper frame would move upward, withdrawing the extended arms to their vertical position and the apparatus would be raised out of the water and the unextended position with the fish secured to the individual hooks.

Therefore, it is a principal object of the present invention to provide an apparatus for accommodating a multiplicity of fishing lines at a single casting of the apparatus;

It is a further principal object of the present invention to provide an apparatus for lowering to a body of water in an unexpanded position, and upon resting on a lake or river bottom or in salt water deep sea fishing areas, expanding into an enlarged area to attract and catch a plurality of fish.

DETAILED DESCRIPTION OF THE PREFERRED EMBODIMENT

Figure 1:
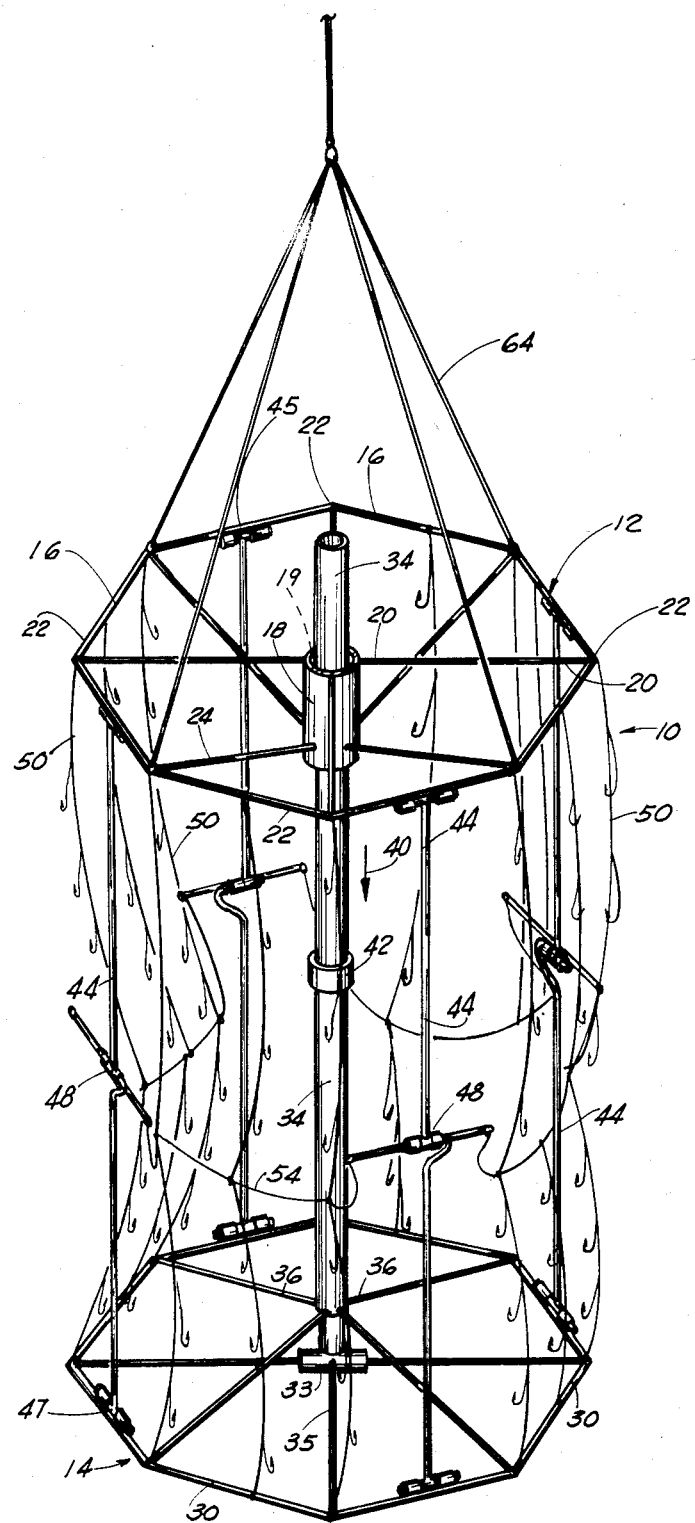
FIG. 1 is a preferred embodiment of the apparatus of the present invention in the retracted position.
Figure 3:
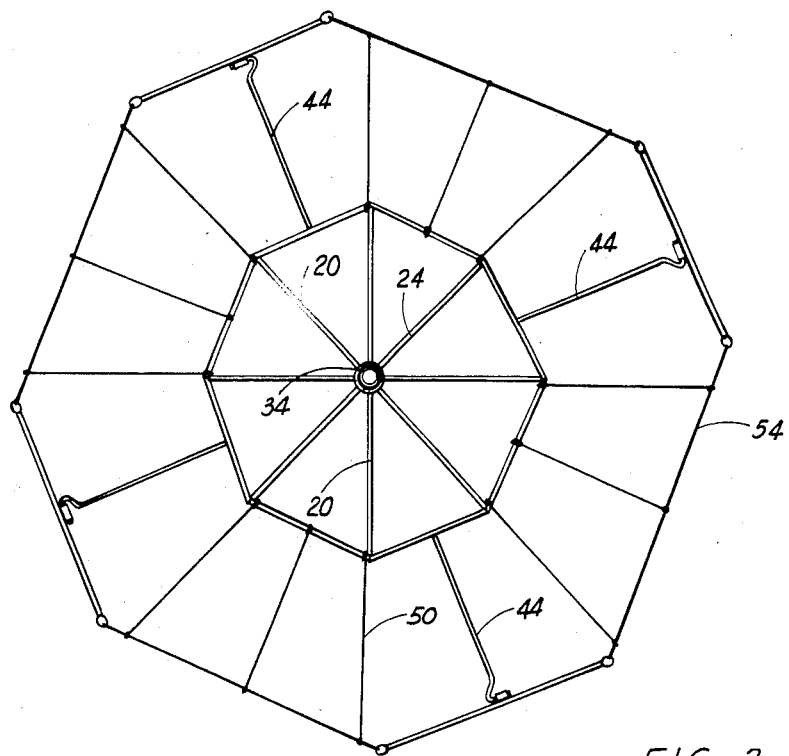
FIG. 3 is a top view of the preferred embodiment of the apparatus of the present invention in the expanded position.
Figure 2:
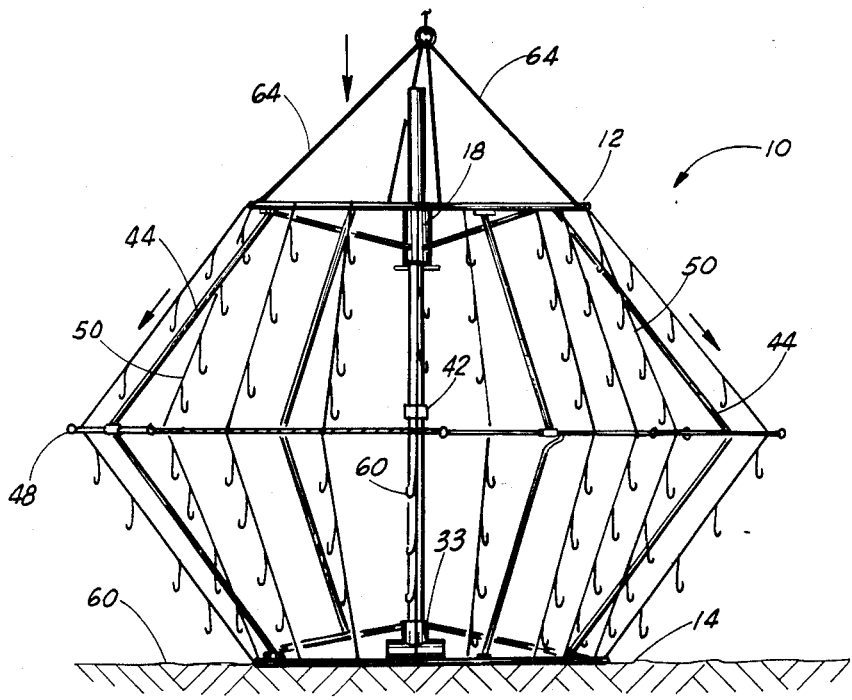
FIG. 2 is a side view of the apparatus of the present invention, illustrating the apparatus in the expanded position resting on the bottom of any waters be it off shore, in deep sea fishing operations or inland waters such as, lakes or river bottoms.

FIGS. 1 through 3 illustrate the preferred embodiment of the apparatus of the present invention as illustrated by the numeral 10. Fishing apparatus 10 generally comprises an upper frame member 12 and a lower base frame member 14. Upper frame member 12 would further comprise a plurality of metal bar members or the like 16 which are rigidly affixed to one another via welding or the like on their ends thereof to form the eight sided or octagon shaped frame member 12. The top base member 12 would further comprise a central collar portion 18 which is generally a section of pipe having a continuous bore 19 therethrough. Collar 18 is centrally located within frame member 12 and held in rigid position via a plurality of upper bar members 20 which would generally comprise four metal bars extending on the outer wall of collar member 18 approximately 90° apart to the second end rigidly attached to the frame member 12 at points 22. Likewise, collar member 18 is further held in position via a second plurality of bar members 24 rigidly attached from the bottom portion of outer wall portion of collar member 18 to frame 12, again equally spaced at 90° angles there apart, so that each end portion of bar members 22 and 24 are rigidly connected via welding or the like at each joint between the respective bar member 16 which make up outer octagonally shaped frame member 12. In this manner, collar member 18 has substantial support in being maintained in rigid position centrally located within the opening of frame member 12.

Likewise, lower base frame member 14 is constructed in the identical manner as frame member 12 i.e., having a plurality of 8 bar members 30 rigidly attached by welding or the like to end portions of one another to form the octagonal shape of lower frame member 14. There is further provided in place of the collar member 18, a "T" member 33, having a vertical portion for threadably accommodating post member 34. There is provided a first plurality of bar members 35 extending between the "T" member 33 at 90° angles from one another, to outer ring member 14 via welding or the like. Likewise, a second plurality of 4 support members 36 are provided at 90° apart welded to "T" member 33 at a position above the point of bar members 34, and extending rigidly between the outer frame 14 and "T" member 33, to give the proper support. Like frame 18, the bar members 34 and 36 extend outwardly and are rigidly welded at each joint between bar members 30 that make up outer frame 14. Post member 34 would be threadably engaged at its lower end to "T" member 33 and extend upward to serve as the support member during operation of the apparatus.

As seen in FIG. 1, bore 19 within collar member 18 is of substantial diameter greater than the diameter of post 34, so that post 34 can slide easily within opening 19, of collar 18 and frame 12 can move upward and downward relative to the static position of base frame 14 on post 34 as seen by arrows 40. This will be important in the functioning of the apparatus as will be discussed further. Post member 34 further comprises a metal stop 42 substantially half way along its length, which is rigidly attached to post member 34 and serves as a means for preventing collar member to slide any further past metal stop 42. This, again will be pertinent in the operation of the apparatus.

Interconnecting upper frame member 12 and lower frame member 14 is a plurality of vertically disposed metal arm members 44 which are hingedly engaged at their upper portion 45 to a segment of frame member 12, and likewise are hingedly engaged to lower frame member 14 via hinge 47. Likewise, there is a hinge member 48 along approximately half the distance along the length of each of said arm members 44, which the plurality of hinge members 48 allowing frame member 12 to move downward relative to base member 14 and the arms radiating outwardly to the position as seen in FIG. 2. There is further provided a horizontally disposed bar member 49 rigidly attached to each hinge member 48, each bar member having an eyelet 51 on each end 53 of said bar members, for threading fishing line therethrough as will be discussed further.

There is further provided a plurality of flexible lines, such as heavy duty fishing line, 50 extending downward between upper frame member 12 and lower frame member 14 at each joint of frame members 16 and 30 respectfully and at each arm 44, so that there is provided a total of 12 lines extending downward and interconnecting at each joint of the respective frame members. Each of said lines 50 extending downward from each frame joint are threaded through eyelets 51 before being attached to lower frame 14. Therefore, as arms 44 expand outward at hinges 48, cords 50 likewise move outward in the expanded position is seen in FIG. 2. Likewise, there is a second continuous flexible line 54 such as "Bungie Cord," which would interconnect between each vertically depending line 50 and each vertical arm member 44 to define a continuous circumferential line around the middle portion of the apparatus as seen in FIG. 1. During operation the flexible cord 54 would flex as the apparatus expanded and retract as the apparatus closed, having very little slack in the line. Also, there could be further provided a second set of fishing lines or the like positioned half way the distance along upper connecting bars 20 and 24 and hanging to the mid point of apparatus 10 for accommodating a plurality of hooks.

As seen in FIG. 2, apparatus 10 has been placed in the "fishing" position, wherein upper frame member 12 has been slid down toward stop 42, with arm members 44 extending outward. As seen in the figure, lower members 44 extending outward, would likewise extend lines 50 outward also, so that the outward extending lines would provide a greater fishing area around the outer circumference in the enlarged circle, and the downward depending line 56 would provide fishing lines toward the inner part of the now fishing circle, as seen in FIG. 3.

In operations, therefore, in the closed position as seen in FIG. 1, hooks 60 would be baited, apparatus 10 would be lowered via a winch or the like into the water, and upon bottom frame 14 resting on the bottom 60, frame 12 would continue to lower until meeting stop 42. At that point, the apparatus would be substantially in the open position as seen in FIG. 2 in being ready to accommodate the possibility of catching a number of fish on hooks 60, in that position. After a period of time, apparatus 10 would then be raised via lines 64 up whereby collar member 18 would slide into the open position as seen in FIG. 1, and upon being in that position, apparatus 10 can be lifted from the water and the fish disengaged from the hooks, with the apparatus baited for a second round of fishing.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. A fishing apparatus comprising:
 a. an upper frame;
 b. a lower base frame;
 c. means for allowing said upper frame to slidably move between open and closed positions in relation to said lower frame;
 d. means interconnecting said upper and lower frame for allowing said apparatus to expand outwardly upon the lowering of said upper frame to the lowered position thereof; and e. a plurality of fishing lines positioned on said apparatus so that upon said apparatus being positioned in said expanded open position, said fishing lines define an extended radial area for fishing, wherein said plurality of fishing lines further provide means for allowing outward movement of said lines for moving said lines into said open expanded position.

2. The apparatus in claim 1, wherein said apparatus further comprises a centrally located collar member mounted to said upper frame.

3. The apparatus in claim 2, wherein said lower frame further incorporates a centrally located post member for slidably engaging said collar member of said upper frame as said apparatus is moved between said open and closed positions.

4. A fishing apparatus comprising;
 a. an upper frame;
 b. a lower base frame;
 c. means secured to said lower base frame for slidably engaging said upper frame as said upper frame is moved between upper and lower positions in relation to said lower frame;
 d. a plurality of arm members further interconnecting said upper and lower frames for expanding radially outward substantially at their center points as said upper frame is moved in closer proximity to said lower frame;
 e. a plurality of first fishing lines positioned about the circumference of said apparatus so that upon said apparatus moving to said lower expanded position, said fishing lines define an extended radial area for attaching means for luring fish thereto; and
 f. a plurality of second flexible fishing lines intermedite said plurality of arm members for securing thereto additional means for luring fish thereto.

5. The apparatus in claim 4, wherein there is further provided a collar member on said upper frame for slidably engaging a central post member therein as said frame is moved between said upper and lower positions.

6. The apparatus in claim 4, wherein said first fishing lines are so secured to said frame so that upon expansion of said arm members said fishing lines likewise expand outward to substantially the position of said arm members.

7. The apparatus of claim 4, wherein said apparatus further comprises a centrally located collar member mounted to said upper frame.

8. The apparatus of claim 4, wherein said plurality of first fishing lines further provide means for allowing outward movement of said lines for moving said lines into said open expanded position.

* * * * *